us010035899B2

(12) United States Patent
Tokita (10) Patent No.: US 10,035,899 B2
(45) Date of Patent: Jul. 31, 2018

(54) POLYCARBONATE RESIN COMPOSITION, AND MOLDED ARTICLE AND METHOD FOR MANUFACTURING SAME

(71) Applicant: MITSUBISHI GAS CHEMICAL COMPANY, INC., Tokyo (JP)

(72) Inventor: Atsuhiro Tokita, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 15/315,126

(22) PCT Filed: Apr. 2, 2015

(86) PCT No.: PCT/JP2015/060442
§ 371 (c)(1),
(2) Date: Nov. 30, 2016

(87) PCT Pub. No.: WO2015/190162
PCT Pub. Date: Dec. 17, 2015

(65) Prior Publication Data
US 2017/0198118 A1    Jul. 13, 2017

(30) Foreign Application Priority Data

Jun. 11, 2014   (JP) .................................. 2014-120495

(51) Int. Cl.
*C08L 69/00*   (2006.01)
*B29B 9/10*    (2006.01)
(Continued)

(52) U.S. Cl.
CPC ................. *C08K 5/14* (2013.01); *B29B 7/88* (2013.01); *B29B 9/10* (2013.01); *B29B 9/12* (2013.01);
(Continued)

(58) Field of Classification Search
CPC ........................................................ C08L 69/00
See application file for complete search history.

(56) References Cited

U.S. PATENT DOCUMENTS 5,409,975 A * 4/1995 Nishiguichi ........... C08G 64/10
                                                          524/147
5,475,786 A * 12/1995 Nishiguchi ............ C08G 64/10
                                                          385/123
(Continued)

FOREIGN PATENT DOCUMENTS

JP    3-239508    10/1991
JP    5-331277    12/1993
(Continued)

OTHER PUBLICATIONS

Machine translation of JP2003-285322 A to Manabe et al.*
(Continued)

*Primary Examiner* — Vu A Nguyen
(74) *Attorney, Agent, or Firm* — Greenblum & Bernstein, P.L.C.

(57) ABSTRACT

According to an embodiment, provided is a polycarbonate resin composition containing a polycarbonate resin, wherein a molded product of the polycarbonate resin composition has an integrated value of an amount of chemiluminescence derived from organic peroxide of 4,000 to 12,000 counts per mg of the molded product, and the integrated value of the amount of chemiluminescence is a value obtained by integrating the amount of chemiluminescence at a wavelength of 405 to 650 nm that is measured during 480 seconds in which under a nitrogen atmosphere the temperature is raised from 100° C. to 350° C. at a rate of 50° C./minute and thereafter is maintained at 350° C. for 180 seconds.

6 Claims, 4 Drawing Sheets

(51) Int. Cl.

| | | |
|---|---|---|
| *B29D 11/00* | (2006.01) | |
| *G02B 1/04* | (2006.01) | |
| *F21V 8/00* | (2006.01) | |
| *C08K 5/14* | (2006.01) | |
| *C09K 11/02* | (2006.01) | |
| *C09K 11/07* | (2006.01) | |
| *C08K 5/527* | (2006.01) | |
| *C08J 3/12* | (2006.01) | |
| *B29B 9/12* | (2006.01) | |
| *B29B 7/88* | (2006.01) | |
| *B29K 69/00* | (2006.01) | |

(52) U.S. Cl.
CPC .. *B29D 11/00009* (2013.01); *B29D 11/00663* (2013.01); *C08J 3/12* (2013.01); *C08K 5/527* (2013.01); *C09K 11/02* (2013.01); *C09K 11/07* (2013.01); *G02B 1/041* (2013.01); *G02B 6/0065* (2013.01); *B29K 2069/00* (2013.01); *C08J 2369/00* (2013.01); *C09K 2211/10* (2013.01)

(56) References Cited

U.S. PATENT DOCUMENTS

| | | | | |
|---|---|---|---|---|
| 5,496,913 | A * | 3/1996 | Nishiguchi | C08G 64/10 |
| | | | | 524/445 |
| 2005/0133697 | A1* | 6/2005 | Potyrailo | C08L 69/00 |
| | | | | 250/216 |
| 2007/0053031 | A1* | 3/2007 | Matsuura | C08L 69/00 |
| | | | | 359/15 |
| 2012/0190778 | A1 | 7/2012 | Wehrmann et al. | |

FOREIGN PATENT DOCUMENTS

| | | |
|---|---|---|
| JP | 6-145337 | 5/1994 |
| JP | 6-145492 | 5/1994 |
| JP | 2001-88176 | 4/2001 |
| JP | 2002-225105 | 8/2002 |
| JP | 2002-254560 | 9/2002 |
| JP | 2002-533544 | 10/2002 |
| JP | 2003-90901 | 3/2003 |
| JP | 2003-285322 | 10/2003 |
| JP | 2005-213346 | 8/2005 |
| JP | 2008-50382 | 3/2008 |
| JP | 2008-285551 | 11/2008 |
| JP | 2009-29031 | 2/2009 |
| JP | 2009-286850 | 12/2009 |
| JP | 2013-506719 | 2/2013 |
| JP | 2013-238634 | 11/2013 |

OTHER PUBLICATIONS

Machine translation of JP2002-225105 A to Isahaya et al.*

Twin Screw Extruder by Japan Steel Works, downloaded on Dec. 6, 2017.*

International Search Report issued Patent Application No. PCT/JP2015/060442, dated Apr. 28, 2015.

Official Communication issued in European Patent Office (EPO) Patent Application No. 15806953.4, dated Jan. 26, 2018.

* cited by examiner

POLYCARBONATE RESIN COMPOSITION, AND MOLDED ARTICLE AND METHOD FOR MANUFACTURING SAME

TECHNICAL FIELD

The present invention relates to a polycarbonate resin composition, and to a molded product and a production method thereof.

BACKGROUND ART

Polycarbonate resins are used in a wide variety of fields because of their excellent transparency, heat resistance, mechanical properties, dimensional accuracy, etc. For example, molded products are produced by injection molding, extrusion, or the like of polycarbonate resin flakes, and are widely used in optical applications such as optical lenses and films. However, with an increase in size of molded products made of polycarbonate resins (hereinafter, simply referred to also as "molded products"), and an increase of use in applications for allowing light to be incident in parallel to a plane such as light guide plates, higher transparency is being required in molded products. That is, coloration of molded products into yellow (in particular, amber color) has become more noticeable, and use of conventional molded products in applications that require high transparency is becoming difficult.

In order to solve such a problem, Patent Literature 1, for example, proposes a method of performing a pretreatment in the synthesis of a polycarbonate resin. Patent Literatures 2 and 3 disclose techniques for controlling the oxygen concentration in the synthesis. Patent Literature 4 discloses a technique for blending an antioxidant to a polycarbonate copolymer. Patent Literature 5 discloses a polycarbonate resin to which a phosphorus compound having a specific oxidation number is added. Patent Literature 6 discloses a technique for performing deoxygenization on a resin raw material before melt-kneading and/or during melt-kneading in a method for producing processed products of an extruded resin. Patent Literature 7 discloses a technique for feeding an inert gas into a heating cylinder provided in a molding device. However, in the current situation, the aforementioned problem cannot be said to be sufficiently solved only by these methods.

As another technique for enhancing the transparency, Patent Literature 8 discloses that a thermoplastic resin is stored with oxygen being blocked. However, even if blocking oxygen can suppress the coloration of the thermoplastic resin with a lapse of storage time to prevent hue deterioration, the hue is not improved as compared with when the thermoplastic resin is produced. Accordingly, inherent hue improvement of the thermoplastic resin is difficult only by improving the storage condition.

As described above, the problem of transparency due to the coloration of molded products cannot be necessarily solved reliably by conventional methods. Therefore, there has been a demand for providing a polycarbonate resin or a composition thereof that can prevent the coloration more reliably (hereinafter, referred to also as "polycarbonate resin (composition)"), a method for producing a molded product thereof, and a polycarbonate resin (composition) molded product that sufficiently suppresses the coloration and has excellent transparency.

Meanwhile, recent studies in the field of medical care have gradually revealed that light in the ultraviolet region and light in the short wavelength region of visible light have adverse effects on eyes and body. In particular, LED is recently used for illumination and light sources of backlight for liquid crystal displays, and the frequency of exposure to the light in the short wavelength region of visible light has increased. Therefore, eyeglass products having a function of absorbing or reflecting the light in the ultraviolet region and light in the short wavelength region of visible light are put on the market. Further, in order to prevent the light in the ultraviolet region and light in the short wavelength region of visible light out of the rays emitted from liquid crystal displays such as personal computers or televisions from entering eyes, front surface plates for displays that absorb and block the light in such regions have been developed.

Conventionally, in order to block light in the ultraviolet region and light in the short wavelength region of visible light, a resin composition to which a dye that absorbs the light in such regions is added, a molded product on which a film that reflects the light in such regions is laminated or which is coated with a reflective layer, and the like have been developed to be applied to eye glasses and the like (for example, Patent Literatures 9 and 10). However, these methods are costly due to the need for the dye or additional members for reflection. Further, due to the need for a dye mixing step, a reflection film laminating step, and a reflective layer coating step, the production process becomes complicated. In particular, in a method of adding the dye, the dye bleeds out of the resin, which can cause problems such as contaminating the surface of the molded product and reducing the ray blocking performance. Further, some of ultraviolet absorbers are designated as Type I specific chemical substances because of their toxicity, and therefore active use thereof is not desirable. Meanwhile, the methods of laminating a reflection film and coating with a reflective layer can have problems such as delamination, cracking, and uneven coating. Accordingly, a polycarbonate resin (composition) that can solve these problems and can block light in the ultraviolet region and light in the short wavelength region of visible light, and a molded product thereof are desired.

CITATION LIST

Patent Literature

Patent Literature 1: Japanese Patent Laid-Open No. H06-145337
Patent Literature 2: Japanese Patent Laid-Open No. H05-331277
Patent Literature 3: National Publication of International Patent Application No. 2002-533544
Patent Literature 4: Japanese Patent Laid-Open No. H06-145492
Patent Literature 5: National Publication of International Patent Application No. 2013-506719
Patent Literature 6: Japanese Patent Laid-Open No. 2009-029031
Patent Literature 7: Japanese Patent Laid-Open No. 2001-088176
Patent Literature 8: Japanese Patent Laid-Open No. H03-239508
Patent Literature 9: Japanese Patent Laid-Open No. 2002-254560
Patent Literature 10: Japanese Patent Laid-Open No. 2013-238634

SUMMARY

Technical Problem

It is an object of the present invention to provide a polycarbonate resin composition having excellent transparency and excellent light blocking properties, and a molded product and a production method thereof.

Solution to Problem

As a result of studies on a method for blocking light in the ultraviolet region and light in the short wavelength region of visible light more conveniently and effectively, the inventors have found that the amount of organic peroxide contained in a polycarbonate resin molded product is closely related to the light blocking rate. Based on this finding, the inventors have found that a molded product having excellent transparency and excellent light blocking properties can be obtained by setting the amount of organic peroxide in the polycarbonate resin molded product within a specific range, and thus we have accomplished the present invention.

That is, the present invention is, for example, as follows.
[1] A polycarbonate resin composition comprising a polycarbonate resin, wherein a molded product of the polycarbonate resin composition has an integrated value of an amount of chemiluminescence derived from organic peroxide of 4,000 to 12,000 counts per mg of the molded product, and the integrated value of the amount of chemiluminescence is a value obtained by integrating the amount of chemiluminescence at a wavelength of 405 to 650 nm that is measured during 480 seconds in which under a nitrogen atmosphere the temperature is raised from 100° C. to 350° C. at a rate of 50° C./minute and thereafter is maintained at 350° C. for 180 seconds.
[2] The polycarbonate resin composition according to [1], wherein the integrated value of the amount of chemiluminescence derived from organic peroxide is 7,000 to 12,000 counts per mg of the molded product.
[3] The polycarbonate resin composition according to [1] or [2], wherein the polycarbonate resin composition contains an antioxidant.
[4] A polycarbonate resin molded product comprising the polycarbonate resin composition according to any of [1] to [3], wherein the integrated value of the amount of chemiluminescence derived from organic peroxide is 4,000 to 12,000 counts per mg of the molded product, and the integrated value of the amount of chemiluminescence is a value obtained by integrating the amount of chemiluminescence at a wavelength of 405 to 650 nm that is measured during 480 seconds in which under a nitrogen atmosphere the temperature is raised from 100° C. to 350° C. at a rate of 50° C./minute and thereafter is maintained at 350° C. for 180 seconds.
[4-1] The polycarbonate resin molded product according to [4], wherein transmittance of light in the ultraviolet region and light in the short wavelength region of visible light is 70% or less, and yellowness (YI value) is 29 or less.
[5] A method for producing the polycarbonate resin molded product according to [4], including (a) a step of mixing the polycarbonate resin with additives including an antioxidant; (b) a step of molding the mixture obtained in the step (a) in the presence of an inert gas to obtain pellets; and (c) a step of molding the pellets to obtain the polycarbonate resin molded product.
[5-1] The production method according to [5], wherein the molding in the step (b) is performed by extrusion, and a ratio (Q/Ns value) of discharge rate (Q) during extrusion with respect to rotational speed (Ns) of an extruder screw is 0.2 or more when the screw has a diameter of 50 mm or less, and 1 or more when the screw has a diameter exceeding 50 mm.
[5-2] The production method according to [5] or [5-1], wherein the molding in the step (b) is performed by extrusion, and the extrusion temperature is 240 to 340° C.
[5-3] The production method according to any of [5] to [5-2], wherein the molding in the step (c) is performed by injection molding, and the molding temperature is 260 to 340° C.
[5-4] The production method according to any of [5] to [5-3], wherein the molding in the step (c) is performed by injection molding, and molding cycle is 30 to 120 seconds.
[6] An eyeglass lens comprising the polycarbonate resin composition according to any of [1] to [3] or the polycarbonate resin molded product according to [4] or [4-1].
[7] A front surface plate for a display, comprising the polycarbonate resin composition according to any of [1] to [3] or the polycarbonate resin molded product according to [4] or [4-1].
[8] A substrate for fluorescence detection analysis comprising the polycarbonate resin composition according to any of [1] to [3] or the polycarbonate resin molded product according to [4] or [4-1].
[9] A light guide plate comprising the polycarbonate resin composition according to any of [1] to [3] or the polycarbonate resin molded product according to [4] or [4-1].

Advantageous Effects of Invention

According to embodiments of the present invention, a polycarbonate resin composition having excellent transparency and excellent light blocking properties, and a molded product and a production method thereof can be provided.

DESCRIPTION OF EMBODIMENTS

Hereinafter, embodiments of the present invention will be described in detail.
<Polycarbonate Resin Composition>

According to an embodiment, a polycarbonate resin composition of the present invention comprises a polycarbonate resin, and a molded product thereof has an integrated value of the amount of chemiluminescence derived from organic peroxide of 4,000 to 12,000 counts per mg of the molded product. Note that the integrated value of the amount of chemiluminescence is a value obtained by integrating the amount of chemiluminescence at a wavelength of 405 to 650 nm that is measured during 480 seconds in which under a nitrogen atmosphere the temperature is raised from 100° C. to 350° C. at a rate of 50° C./minute and thereafter is maintained at 350° C. for 180 seconds.

Further, according to another embodiment, a polycarbonate resin molded product having the above prescribed integrated value of the amount of chemiluminescence derived from organic peroxide is provided.

Almost all organic materials generate organic peroxide when they are oxidized by oxygen or free radicals. A polycarbonate resin molded product is produced mainly by performing (i) a step of producing a polycarbonate resin by polymerization of raw material monomers, (ii) a step of mixing the polycarbonate resin with additives, (iii) a step of pelletizing the mixture of the polycarbonate resin with the additives, and (iv) a step of molding the obtained pellets. In these steps, organic peroxide is easily generated particularly in steps (iii) and (iv) because these steps includes heat treatment.

The embodiment can provide a molded product having excellent transparency and excellent light blocking properties by producing the polycarbonate resin, the composition thereof, and the molded product thereof so that the amount of organic peroxide in the polycarbonate resin molded product falls within a specific range. The polycarbonate resin molded product of the embodiment is beneficial in being capable of blocking light at a wavelength in a wide range (about 290 to 500 nm), particularly, being capable of effectively blocking light in the ultraviolet region and light in the short wavelength region of visible light that can cause adverse effects on human body. Note that the light in the short wavelength region of visible light means light at a wavelength of about 400 to 480 nm. The light in the ultraviolet region and the light in the short wavelength region of visible light, for example, mean light at a wavelength of 290 to 480 nm. According to the embodiment of the present invention, light at a wavelength, for example, of 290 to 500 nm, 290 to 480 nm, 290 to 400 nm, 290 to 380 nm, 290 to 350, or 290 to 330 nm can be blocked. It should be noted that the term "blocking light" in this specification is used in the meaning including not only the case where light can be completely blocked, but also the case where the optical transmittance is more reduced than in the case where the polycarbonate molded product according to the embodiment of the present invention is not used.

In the embodiment, the amount of organic peroxide in the polycarbonate resin molded product is expressed in terms of the amount of chemiluminescence. The amount of chemiluminescence can be measured by a chemical emission spectrometry and can be measured, for example, using a chemiluminescent analyzer (CLA-FS3), manufactured by TOHOKU ELECTRONIC INDUSTRIAL Co., Ltd. Organic peroxide contained in the molded product is decomposed by heat treatment of the polycarbonate resin molded product, so as to generate a carbonyl compound and oxygen, and the carbonyl compound and oxygen generate luminescence (chemical luminescence) when they return to the ground state after being electronically excited. In this specification, an integrated value of the amount of chemiluminescence at a wavelength of 405 to 650 nm is used as an indicator of the amount of organic peroxide. The integrated value of the amount of chemiluminescence is a value obtained by summing all the values of the amount of chemiluminescence measured during 480 seconds in which under a nitrogen atmosphere the temperature is raised from 100° C. to 350° C. at a rate of 50° C./minute (for 300 seconds) and thereafter is maintained at 350° C. for 180 seconds. The integrated amount of luminescence is obtained, for example, by performing the measurement every second such as at 1 second, 2 seconds, 3 seconds, . . . and 480 seconds from the start of the temperature increase, and summing the values of the amount of chemiluminescence obtained each time (for one second) for 480 seconds. This method enables measurement of luminescence from a material at the photon level and therefore enables detection of peroxide with very high-sensitivity as compared with titration assays of peroxide that have been conventionally performed.

In the embodiment, the integrated value of the amount of chemiluminescence derived from organic peroxide is preferably 4,000 to 12,000 counts per mg of the molded product, more preferably 6,000 to 12,000, particularly preferably 7,000 to 12,000. When organic peroxide is excessively present (for example, exceeding 12,000 counts), the transmittance of the light in the short wavelength region of visible light excessively decreases, and a problem that the polycarbonate resin molded product becomes yellowish can be caused. On the other hand, when the amount of organic peroxide is excessively small (for example, less than 4,000 counts), obtaining the polycarbonate resin molded product tends to be difficult.

The amount of organic peroxide in the polycarbonate resin molded product can be controlled in the production process of each of the polycarbonate resin, and the composition and the molded product thereof. For example, it can be controlled by addition of an antioxidant, the conditions for preparing pellets of the polycarbonate resin composition by extrusion (such as atmosphere, extrusion temperature, discharge rate during extrusion, and rotational speed of the screw of the extruder), and the conditions for preparing the molded product by injection molding (such as molding temperature and molding cycle).

According to the embodiment of the present invention, the amount of organic peroxide in the polycarbonate resin molded product falls within a specific range, thereby enabling both the transparency and the light blocking properties (blocking properties particularly against light in the ultraviolet region and light in the short wavelength region of visible light) to be obtained. Further, since there is no need of addition of additives such as an ultraviolet absorber, lamination of reflection films, and coating on reflective layers for blocking light, a molded product having excellent light blocking properties can be produced conveniently and inexpensively.

In the molded product according to the embodiment of the present invention, the transmittance of light in the ultraviolet region and light in the short wavelength region of visible light is, for example, 70% or less, 60% or less, 50% or less, 40% or less, 30% or less, or 20% or less. Further, the yellowness (YI value) of the molded product according to the embodiment of the present invention is, for example, 29 or less, 25 or less, 20 or less, or 17 or less.

Hereinafter, each component of the polycarbonate resin composition according to the embodiment will be sequentially described.

1. Polycarbonate Resin

The polycarbonate resin of the embodiment is produced, for example, by interfacial polymerization, transesterification, or the like.

Specifically, the polycarbonate resin is obtained by reacting an aromatic dihydroxy compound with phosgene (that is, carbonyl dichloride). Alternatively, the aromatic dihydroxy compound may be reacted with diester carbonate (such as dimethyl carbonate and diphenyl carbonate) or a carbonyl compound (such as carbon monoxide and carbon dioxide). The polycarbonate resin in the embodiment is a straight or branched chain thermoplastic aromatic polycarbonate resin, and may be a copolymer.

Examples of the aromatic dihydroxy compound as a raw material can include 2,2-bis(4-hydroxyphenyl)propane (that is, bisphenol A), 2,2-bis(4-hydroxy-3,5-dimethylphenyl)

propane, 2,2-bis(4-hydroxy-3,5-diethylphenyl)propane, 2,2-bis(4-hydroxy-(3,5-diphenyl)phenyl)propane, 2,2-bis(4-hydroxy-3,5-dibromophenyl)propane, 2,2-bis(4-hydroxyphenyl)pentane, 2,4'-dihydroxy-diphenylmethane, bis-(4-hydroxyphenyl)methane, bis-(4-hydroxy-5-nitrophenyl)methane, 1,1-bis(4-hydroxyphenyl)ethane, 3,3-bis(4-hydroxyphenyl)pentane, 1,1-bis(4-hydroxyphenyl)cyclohexane, bis(4-hydroxyphenyl)sulfone, 2,4'-dihydroxydiphenylsulfone, bis(4-hydroxyphenyl)sulfide, 4,4'-dihydroxydiphenylether, 4,4'-dihydroxy-3,3'-dichlorodiphenylether, 4,4'-dihydroxy-2,5-diethoxydiphenylether, 1-phenyl-1,1-bis(4-hydroxyphenyl)ethane, 1,1-bis(4-hydroxy-3-methylphenyl)cyclohexane, and 1-phenyl-1,1-bis(4-hydroxy-3-methylphenyl)ethane. Bis(4-hydroxyphenyl)alkanes are preferable, and 2,2-bis(4-hydroxyphenyl)propane (that is, bisphenol A) is particularly preferable. These aromatic dihydroxy compounds can be used singly or in combinations of two or more.

In order to obtain a branched polycarbonate, polyhydroxy compounds such as phloroglucin, 4,6-dimethyl-2,4,6-tris(4-hydroxyphenyl)heptene-2,4,6-dimethyl-2,4,6-tris(4-hydroxyphenyl)heptane, 2,6-dimethyl-2,4,6-tris(4-hydroxyphenyl)heptene-3,1,3,5-tris(4-hydroxyphenyl)benzene, and 1,1,1-tris(4-hydroxyphenyl)ethane; 3,3bis(4-hydroxyaryl)oxyindole (that is, isatin bisphenol), 5-chloroisatin bisphenol, 5,7-dichloroisatin bisphenol, 5-bromoisatin bisphenol, or the like may be used as a part of the aforementioned aromatic dihydroxy compound. The amount used thereof is, for example, 0.01 to 10 mol %, preferably 0.1 to 2 mol %, of the aromatic dihydroxy compound.

In the case of using interfacial polymerization, the reaction is performed in the presence of an organic solvent or an alkaline aqueous solution that is inert to the reaction generally with the pH maintained at 10 or more. First, the polycarbonate resin is obtained by reacting the aromatic dihydroxy compound with phosgene, thereafter adding a polymerization catalyst such as a tertiary amine or a quaternary ammonium salt thereto, and performing interfacial polymerization. Optionally, a molecular weight modifier (terminating agent), an antioxidant for preventing oxidation of the aromatic dihydroxy compound, or the like may be added. The timing of adding the molecular weight modifier is not particularly limited as long as the timing is from the start of the reaction of the aromatic dihydroxy compound with phosgene to the start of the polymerization reaction. Further, the antioxidant can be added at any timing before the start of the polymerization reaction. It should be noted that the reaction temperature is, for example, 0 to 35° C., and the reaction time is, for example, several minutes to several hours.

Examples of the organic solvent that is inert to the reaction can include chlorinated hydrocarbons such as dichloromethane, 1,2-dichloroethane, chloroform, monochlorobenzene, and dichlorobenzene, and aromatic hydrocarbons such as benzene, toluene, and xylene. Examples of the alkaline solution can include a sodium hydroxide aqueous solution and a potassium hydroxide aqueous solution. As the molecular weight modifier or the terminating agent, a compound having a monovalent phenolic hydroxyl group can be mentioned, and specific examples thereof can include m-methylphenol, p-methylphenol, m-propylphenol, p-propylphenol, p-tert-butylphenol, and p-long-chain alkyl-substituted phenol. Examples of the polymerization catalyst can include tertiary amines such as trimethylamine, triethylamine, tributylamine, tripropylamine, trihexylamine, and pyridine; and quaternary ammonium salts such as trimethylbenzylammonium chloride, tetramethylammonium chloride, and triethylbenzylammonium chloride.

As the antioxidant, hydrosulfite can be used, for example.

The molecular weight of the polycarbonate resin is preferably 10,000 to 100,000, more preferably 12,000 to 50,000, most preferably 14,000 to 24,000, as a viscosity-average molecular weight measured from the viscosity of a methylene chloride solution at 25° C. When the viscosity-average molecular weight is less than 10,000, there may be a reduction in mechanical properties of the polycarbonate resin molded product with surface decoration such as coating and printing using a treatment agent containing an organic solvent in some cases. Conversely, when the viscosity-average molecular weight exceeds 100,000, poor appearance can be seen due to insoluble gel, which is not preferable.

The polycarbonate resin may be contained in the polycarbonate resin composition, in the form of powder particles (flakes). The powder particles (flakes) of the polycarbonate resin are produced, for example, by adding a dichloromethane solution containing the polycarbonate resin obtained by interfacial polymerization dropwise to hot water maintained at about 45° C. and removing the solvent by evaporation. Alternatively, the flakes of the polycarbonate resin are produced by putting a dichloromethane solution containing the polycarbonate resin obtained by interfacial polymerization into methanol, followed by filtration and drying of the precipitated polymer. Further, the flakes of the polycarbonate resin can be produced also by stirring and grinding a dichloromethane solution containing the polycarbonate resin obtained by interfacial polymerization maintained at about 40° C. under stirring with a kneader, followed by removal of the solvent with hot water at 95° C. or more.

2. Additives

The polycarbonate resin composition may contain additives other than the polycarbonate resin. Examples of the additives include an antioxidant, a thermal stabilizer, and a mold release agent. It should be noted that the antioxidant described below can act also as a thermal stabilizer.

(1) Antioxidant

The antioxidant is preferably one or more selected from the group consisting of a phenolic antioxidant, a sulfur antioxidant, and a phosphorus antioxidant.

(Phenolic Antioxidant)

Examples of the phenolic antioxidant include alkylated monophenols such as 2,6-di-t-butyl-4-methylphenol; alkylthiomethylphenols such as 2,4-dioctylthiomethyl-6-t-butylphenol; alkylidenebisphenols such as 2,2'-methylenebis(4-methyl-6-t-butylphenol) and the derivatives thereof; acylaminophenol derivatives such as 4-hydroxylauric acid anilide; an ester compound of β-(3,5-di-t-butyl-4-hydroxyphenyl)propionic acid with a monohydric alcohol such as methanol or a polyhydric alcohol such as pentaerythritol; hydroxylated thiodiphenyl ethers such as 2,2'-thiobis(6-t-butylphenol); benzyl derivatives such as 3,5,3',5'-tetra-t-butyl-4,4'-dihydroxydibenzyl ether; triazine derivatives such as 2,4-bis(n-octylthio)-6-(4-hydroxy-3,5-di-t-butylanilino)-1,3,5-triazine; and hydroxybenzylated malonate derivatives such as dioctadecyl-2,2-bis(3,5-di-t-butyl-2-hydroxybenzyl) malonate. These exemplified phenolic antioxidants can be used singly or in combinations of two or more.

(Sulfur Antioxidant)

Examples of the sulfur antioxidant include dilauryl 3,3'-thiodipropionate.

(Phosphorus Antioxidant)

Examples of the phosphorus antioxidant include phosphite compounds.

Examples of the phosphite compounds include triphenyl phosphite, tris(nonylphenyl)phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, tris(diethylphenyl)phosphite, tris(di-iso-propylphenyl)phosphite, tris(di-n-butylphenyl)phosphite, tris(2,4-di-tert-butylphenyl)phosphite, tris(2,6-di-tert-butylphenyl)phosphite, distearyl pentaerythritol diphosphite, bis(2,4-di-tert-butylphenyl)pentaerythritol diphosphite, bis(2,6-di-tert-butyl-4-methylphenyl)pentaerythritol diphosphite, bis(2,6-di-tert-butyl-4-ethylphenyl)pentaerythritol diphosphite, bis{2,4-bis(1-methyl-1-phenylethyl)phenyl}pentaerythritol diphosphite, phenyl bisphenol A pentaerythritol diphosphite, bis(nonylphenyl)pentaerythritol diphosphite, and dicyclohexyl pentaerythritol diphosphite.

As still other examples, phosphite compounds that react with dihydric phenols and have cyclic structures can be used. Examples of such phosphite compounds include 2,2'-methylenebis(4,6-di-tert-butylphenyl)(2,4-di-tert-butylphenyl)phosphite, 2,2'-methylenebis(4,6-di-tert-butylphenyl)(2-tert-butyl-4-methylphenyl)phosphite, and 2,2-methylenebis(4,6-di-tert-butylphenyl)octyl phosphite.

Among the aforementioned phosphite compounds, pentaerythritol diphosphite compounds represented by Formula (1) below are preferable, and distearyl pentaerythritol diphosphite, bis(2,4-di-tert-butylphenyl) pentaerythritol diphosphite, and bis(2,6-di-tert-butyl-4-methylphenyl) pentaerythritol diphosphite are particularly preferable.

[Formula 1]

(1)

[where R and R' each independently represent a group selected from the group consisting of a hydrogen atom, an alkyl group having 1 to 20 carbon atoms, an aryl group or an alkyl aryl group having 6 to 20 carbon atoms, an aralkyl group having 7 to 30 carbon atoms, a cycloalkyl group having 4 to 20 carbon atoms, and a 2-(4-oxyphenyl)propyl-substituted aryl group having 15 to 25 carbon atoms. The cycloalkyl group and the aryl group may be further substituted with an alkyl group.]

These exemplified phosphorus antioxidants can be used singly or in combinations of two or more.

The antioxidant is preferably added in an amount of 0.001 to 3 wt % with respect to the polycarbonate resin composition.

(2) Mold Release Agent

Examples of the mold release agent can include at least one compound selected from the group consisting of an aliphatic carboxylic acid, an ester of an aliphatic carboxylic acid with an alcohol, an aliphatic hydrocarbon compound having a number-average molecular weight of 200 to 15,000, a polyether having a number-average molecular weight of 100 to 5,000, and polysiloxane silicone oil. Examples of the aliphatic carboxylic acid can include monovalent, divalent, or trivalent saturated or unsaturated aliphatic carboxylic acids. Note that the aliphatic carboxylic acid includes alicyclic carboxylic acids. Among these, the aliphatic carboxylic acid is preferably a monovalent or divalent carboxylic acid having 6 to 36 carbon atoms, more preferably a monovalent saturated aliphatic carboxylic acid having 6 to 36 carbon atoms. Specific examples of the aliphatic carboxylic acid can include palmitic acid, stearic acid, caproic acid, capric acid, lauric acid, arachic acid, behenic acid, lignoceric acid, cerotic acid, melissic acid, tetratriacontanoic acid, montanic acid, adipic acid, and azelaic acid.

As the aliphatic carboxylic acid in the ester of an aliphatic carboxylic acid with an alcohol, the same aliphatic carboxylic acid as mentioned above can be used. Meanwhile, examples of the alcohol can include monohydric or polyhydric saturated or unsaturated alcohols. These alcohols may have a substituent such as a fluorine atom and an aryl group. Among these, a monohydric or polyhydric saturated alcohol having 30 or less carbon atoms is preferable, and a monohydric or polyhydric saturated aliphatic alcohol having 30 or less carbon atoms is more preferable. Note that the aliphatic compound includes alicyclic compounds. Specific examples of the alcohol can include octanol, decanol, dodecanol, stearyl alcohol, behenyl alcohol, ethylene glycol, diethylene glycol, polypropylene glycol, glycerin, pentaerythritol, 2,2-dihydroxyperfluoropropanol, neopentylene glycol, ditrimethylolpropane, and dipentaerythritol. The aforementioned ester compound may contain an aliphatic carboxylic acid and/or an alcohol as impurities, or may be a mixture of a plurality of compounds. Specific examples of the ester of an aliphatic carboxylic acid with an alcohol can include beeswax (a mixture containing myricyl palmitate as the main component), stearyl stearate, behenyl behenate, stearyl behenate, glycerol monopalmitate, glycerol monostearate, glycerol distearate, glycerol tristearate, pentaerythritol monopalmitate, pentaerythritol monostearate, pentaerythritol distearate, pentaerythritol tristearate, and pentaerythritol tetrastearate.

Examples of the aliphatic hydrocarbon having a number-average molecular weight of 200 to 15,000 can include liquid paraffin, paraffin wax, micro wax, polyethylene wax, Fischer-Tropsch wax, and α-olefin oligomers having 3 to 12 carbon atoms. Note that the aliphatic hydrocarbon includes alicyclic hydrocarbons. Further, these hydrocarbon compounds may be partially oxidized. Among these, paraffin wax, polyethylene wax, or partially oxidized products of polyethylene wax are preferable, and paraffin wax and polyethylene wax are more preferable. The number-average molecular weight of the aforementioned aliphatic hydrocarbon is preferably 200 to 5,000. These aliphatic hydrocarbons may be a single substance or a mixture of materials having different components or molecular weight, as long as the number-average molecular weight of the main component falls within the aforementioned range.

Examples of the polyether having a number-average molecular weight of 100 to 5,000 include polyethylene glycol, polypropylene glycol, and polytetramethylene ether glycol.

Examples of the polysiloxane silicone oil can include dimethyl silicone oil, phenyl methyl silicone oil, diphenyl silicone oil, and fluorinated alkyl silicone. These may be used singly or in combinations of two or more.

The mold release agent is preferably added in an amount of 0.001 to 3 wt % with respect to the polycarbonate resin composition.

<Method for Producing Molded Product>

Next, a method for producing the polycarbonate resin molded product will be described.

According to an embodiment, the method for producing the polycarbonate resin molded product described above includes: (a) a step of mixing the polycarbonate resin with additives including an antioxidant; (b) a step of obtaining pellets by molding the mixture obtained in the step (a) in the presence of an inert gas; and (c) a step of obtaining the polycarbonate resin molded product by molding the pellets.

Hereinafter, each step will be sequentially described.

Step (a)

The additives may be directly mixed with the polycarbonate resin using a tumbler, a blender, or the like, or a master badge composed of all the additives prepared in advance may be mixed with the polycarbonate resin. Further, while some of additives are directly mixed with the polycarbonate resin, a master badge of the other additives prepared in advance may be mixed with the polycarbonate resin. The additives include an antioxidant, and specific examples, amounts added, etc., thereof are as described above. Additives that can be contained therein other than the antioxidant are also as described above. The amount of organic peroxide in the polycarbonate resin molded product can be controlled by adding the antioxidant.

Step (b)

Subsequently, pellets are prepared by molding the polycarbonate resin composition obtained in the step (a) in the presence of an inert gas. The molding method is not specifically limited, but examples thereof include extrusion. Examples of the inert gas include nitrogen gas, argon gas, and carbon dioxide gas, and nitrogen gas is preferable. For example, pellets can be prepared in the presence of an inert gas by rendering the inside of the material inlet (hopper) of the extruder into an inert gas atmosphere. The oxygen concentration inside the hopper is preferably 5% or less, more preferably 3% or less, particularly preferably 1% or less. The extrusion temperature is preferably 240 to 340° C., more preferably 240 to 320° C., particularly preferably 240 to 280° C.

The amount of organic peroxide in the polycarbonate resin molded product can be controlled by the conditions for preparing pellets of the polycarbonate resin composition by extrusion (such as atmosphere, extrusion temperature, discharge rate during extrusion, and rotational speed of the screw of the extruder).

Further, the amount of organic peroxide in the polycarbonate resin molded product can be controlled so as to fall within a preferable range also by operating the extruder so that the ratio of discharge rate (Q) during extrusion with respect to rotational speed (Ns) of the extruder screw (Q/Ns value) falls within a specific range. The preferable value varies depending on the scale of the extruder such as screw diameter, but preferably satisfies Q/Ns value ≥0.2, more preferably 0.2≤Q/Ns value≤0.7, for example, in the case of using an extruder with a screw diameter of 50 mm or less. Meanwhile, in the case of using an extruder with a screw diameter exceeding 50 mm, it preferably satisfies Q/Ns value ≥1, more preferably 1≤Q/Ns value ≤2. By operating the extruder so that the Q/Ns value falls within the aforementioned range, heat generation due to shear is suppressed, and the resin temperature is less likely to increase. Therefore, generation of organic peroxide in the preparation of pellets can be suppressed. Further, when the Q/Ns value falls within the aforementioned range, the filling rate of the heating cylinder of the extruder with the resin composition increases. Therefore, incorporation of air that is one of the causes for generation of organic peroxide is less likely to occur, and generation of organic peroxide in the preparation of pellets can be suppressed. Meanwhile, when the Q/Ns value exceeds the upper limit value of the aforementioned range (which is 0.7 in the case of using an extruder with a screw diameter of 50 mm or less, and 2 in the case of using an extruder with a screw diameter exceeding 50 mm), vent-up (that is, leakage of the resin through the deaeration port) tends to occur, which can be problematic in view of stable production.

Step (c)

Finally, the polycarbonate resin molded product is obtained by further molding the pellets obtained above in the step (b). The molding method is not particularly limited, but examples thereof include injection molding. The amount of organic peroxide in the polycarbonate resin molded product can be controlled also by the conditions for injection molding (such as molding temperature and molding cycle). The molding temperature is preferably 260 to 340° C., more preferably 260 to 320° C., particularly preferably 260 to 300° C. The molding cycle is preferably 30 to 120 seconds, more preferably 30 to 90 seconds.

The polycarbonate resin molded product according to the embodiment in which the integrated value of the amount of chemiluminescence derived from organic peroxide is 4,000 to 12,000 counts per mg of the molded product can be obtained by optionally combining the aforementioned conditions that can contribute to the generation of organic peroxide. In particular, it is preferable to combine (i) adding an antioxidant, (ii) preparing pellets of the polycarbonate resin composition in the presence of an inert gas, and (iii) operating an extruder so that the Q/Ns value falls within a specific range (that is, Q/Ns value 0.2 is satisfied in the case of using an extruder with a screw diameter of 50 mm or less, and Q/Ns value 1 is satisfied in the case of using an extruder with a screw diameter exceeding 50 mm). In addition to the aforementioned conditions (i) to (iii), conditions such as extrusion temperature and injection conditions may be further added.

<Applications>

The polycarbonate resin composition according to the embodiment of the present invention and the molded product thereof can be used for various applications that require transparency and light blocking properties. For example, it is beneficial to use the polycarbonate resin molded product of the embodiment for applications such as an eyeglass lens, a front surface plate for a display, a substrate for fluorescence detection analysis, a light guide plate, a headlight lens for automobiles, a lens for LED light, and a window glass for automobiles and buildings. Therefore, according to an embodiment of the present invention, an eyeglass lens, a front surface plate for a display, a substrate for fluorescence detection analysis, or a light guide plate including the aforementioned polycarbonate resin composition or the molded product is provided.

Note that the substrate for fluorescence detection analysis is used for applications such as biochips including a DNA chip (DNA microarray), a protein chip (protein chip and protein array), an enzyme chip, an antigen chip, an antibody chip, a cell chip, and a microorganism chip in the fields of biochemical, medical care diagnostics, drug discovery, microorganisms inspection, foods, environment, health care, etc., and reaction chips using a Lab-on-a-chip or MEMS (Micro Electoro Mechanical Systems) in which channels, reaction fields, and detection units are miniaturized and integrated by microfabrication technology to which nanotechnology is applied. The front surface plate for a display is a member arranged on the entire surface of various displays such as a CRT, PDP (plasma display), liquid crystal panel (LCD), and an organic EL panel. The light guide plate is, for example, used in a backlight unit of a display device, and is a member serving to allow light from the light source to diffuse in the plane direction of an image display unit so as to emit from the emitting surface.

EXAMPLES

Hereinafter, the present invention will be described in detail by way of examples, but the contents of the present invention are not limited by these examples.
(1) Production of Molded Product First, according to Examples 1 to 3 and Comparative Examples 1 to 3 below, molded products of the polycarbonate resin were produced.

Example 1

500 wtppm of a phosphorus antioxidant (PEP36, manufactured by ADEKA CORPORATION) and 300 wtppm of a mold release agent (Rikemal S-100A) were added to polycarbonate powder (H4000 flakes, manufactured by Mitsubishi Engineering-Plastics Corporation) synthesized by interfacial polymerization, and it was mixed using a tumbler. Note that the antioxidant and the mold release agent were added so as to be concentrations of 500 wtppm and 300 wtppm, respectively, with respect to the mixture to be obtained (the same applies to Examples and Comparative Examples below).

An inert gas (nitrogen) was introduced in advance into a material inlet (hopper) of a twin screw extruder (TEX54αII, manufactured by THE JAPAN STEEL WORKS, LTD., with a screw diameter of 58 mm), so that the oxygen concentration in the atmosphere inside the hopper is 1% or less. The powder mixture of the polycarbonate with the additives obtained above was put into the hopper of the twin screw extruder, and pellets were prepared by melt extrusion at 260° C. Note that the discharge rate of the twin screw extruder was 500 kg/hr, and the screw rotation speed thereof was 500 rpm (Q/Ns value=1).

The obtained pellets of the polycarbonate resin composition were molded using an injection molding machine to obtain a molded product. The injection molding conditions herein were as follows.
Injection molding machine: Injection molding machine TR100EH2, manufactured by Sodick Plustech Co., Ltd.
Dimensions of molded product: Width 5 mm×Thickness 4 mm×Length 300 mm
Molding temperature: 320° C.
Die temperature: 120° C.
Molding cycle: 60 seconds

Example 2

400 wtppm of a phosphorus antioxidant (PEP36, manufactured by ADEKA CORPORATION) and 300 wtppm of a mold release agent (Rikemal S-100A) were added to polycarbonate powder (H4000 flakes, manufactured by Mitsubishi Engineering-Plastics Corporation) synthesized by interfacial polymerization, and it was mixed using a tumbler.

An inert gas (nitrogen) was introduced in advance into a material inlet (hopper) of a twin screw extruder (TEM26SS, manufactured by TOSHIBA MACHINE CO., LTD., with a screw diameter of 26 mm), so that the oxygen concentration in the atmosphere inside the hopper is 1% or less. The powder mixture of the polycarbonate with the additives obtained above was put into the hopper of the twin screw extruder, and pellets were prepared by melt extrusion at 250° C. Note that the discharge rate of the twin screw extruder was 30 kg/hr, and the screw rotation speed thereof was 150 rpm (Q/Ns value=0.2).

The obtained pellets of the polycarbonate resin composition were molded using an injection molding machine to obtain a molded product. The injection molding conditions herein were the same as in Example 1.

Example 3

500 wtppm of a phosphorus antioxidant (PEP36, manufactured by ADEKA CORPORATION) and 3000 wtppm of a mold release agent (UNIOL D-2000, manufactured by NOF CORPORATION) were added to polycarbonate powder (H4000 flakes, manufactured by Mitsubishi Engineering-Plastics Corporation) synthesized by interfacial polymerization, and it was mixed using a Nauta mixer.

An inert gas (nitrogen) was introduced in advance into a material inlet (hopper) of a twin screw extruder (TEM58SS, manufactured by TOSHIBA MACHINE CO., LTD., with a screw diameter of 58 mm), so that the oxygen concentration in the atmosphere inside the hopper is 1% or less. The powder mixture of the polycarbonate with the additives obtained above was put into the hopper of the twin screw extruder, and pellets were prepared by melt extrusion at 260° C. Note that the discharge rate of the twin screw extruder was 600 kg/hr, and the screw rotation speed thereof was 600 rpm (Q/Ns value=1).

The obtained pellets of the polycarbonate resin composition were molded using an injection molding machine to obtain a molded product. The injection molding conditions herein were the same as in Example 1.

Comparative Example 1

500 wtppm of a phosphorus antioxidant (PEP36, manufactured by ADEKA CORPORATION) and 300 ppm of a mold release agent (Rikemal S-100A) were added to polycarbonate powder (H4000 flakes, manufactured by Mitsubishi Engineering-Plastics Corporation) synthesized by interfacial polymerization, and it was mixed using a tumbler.

The powder mixture of the polycarbonate with the additives obtained above was put into a hopper of a twin screw extruder (TEM26SS, manufactured by TOSHIBA MACHINE CO., LTD.), and pellets were prepared by melt extrusion at 260° C. Note that the discharge rate of the twin screw extruder was 15 kg/hr, and the screw rotation speed thereof was 150 rpm (Q/Ns value=0.1). Further, the atmosphere inside the hopper of the twin screw extruder was air.

The obtained pellets of the polycarbonate resin composition were molded using an injection molding machine to obtain a molded product. The injection molding conditions herein were the same as in Example 1.

Comparative Example 2

An inert gas (nitrogen) was introduced in advance into a material inlet (hopper) of a twin screw extruder (TEM26SS, manufactured by TOSHIBA MACHINE CO., LTD.), so that the oxygen concentration in the atmosphere inside the hopper is 1% or less. Polycarbonate powder (H4000 flakes, manufactured by Mitsubishi Engineering-Plastics Corporation) synthesized by interfacial polymerization was put into a hopper of the twin screw extruder, and pellets were prepared by melt extrusion at 260° C. Note that the discharge rate of the twin screw extruder was 20 kg/hr, and the screw rotation speed thereof was 150 rpm (Q/Ns value=0.13).

The obtained pellets of the polycarbonate resin composition were molded using an injection molding machine to obtain a molded product. The injection molding conditions herein were the same as in Example 1.

Comparative Example 3

An existing polycarbonate product (LC1500, manufactured by Idemitsu Kosan Co., Ltd.) was used. The pellets thereof were molded using an injection molding machine to obtain a molded product. The injection molding conditions herein were the same as in Example 1.

(2) Measurement of Amount of Chemiluminescence

For each of the molded products produced in Examples 1 to 3 and Comparative Examples 1 to 3, the amount of chemiluminescence was measured using a chemiluminescent analyzer (CLA-FS3), manufactured by TOHOKU ELECTRONIC INDUSTRIAL Co., Ltd.

(Measurement 1)

About 20 mg of the molded product as a measurement object that was put on a 7-mm diameter aluminum pan was put into a sample chamber (LN type) maintained at 100° C., and the temperature was increased from 100° C. to 350° C. at a temperature increase rate of 50° C./minute. Thereafter, it was maintained at 350° C. for 180 seconds, and the chemical luminescence emitted during 480 seconds as the total of the temperature increase time and the temperature holding time was measured. The measurement was performed every second, and an integrated amount of luminescence was obtained by summing the values of luminescence brightness (counts/second) emitted each time (for one second) for the measurement time (480 seconds).

Figure 1:
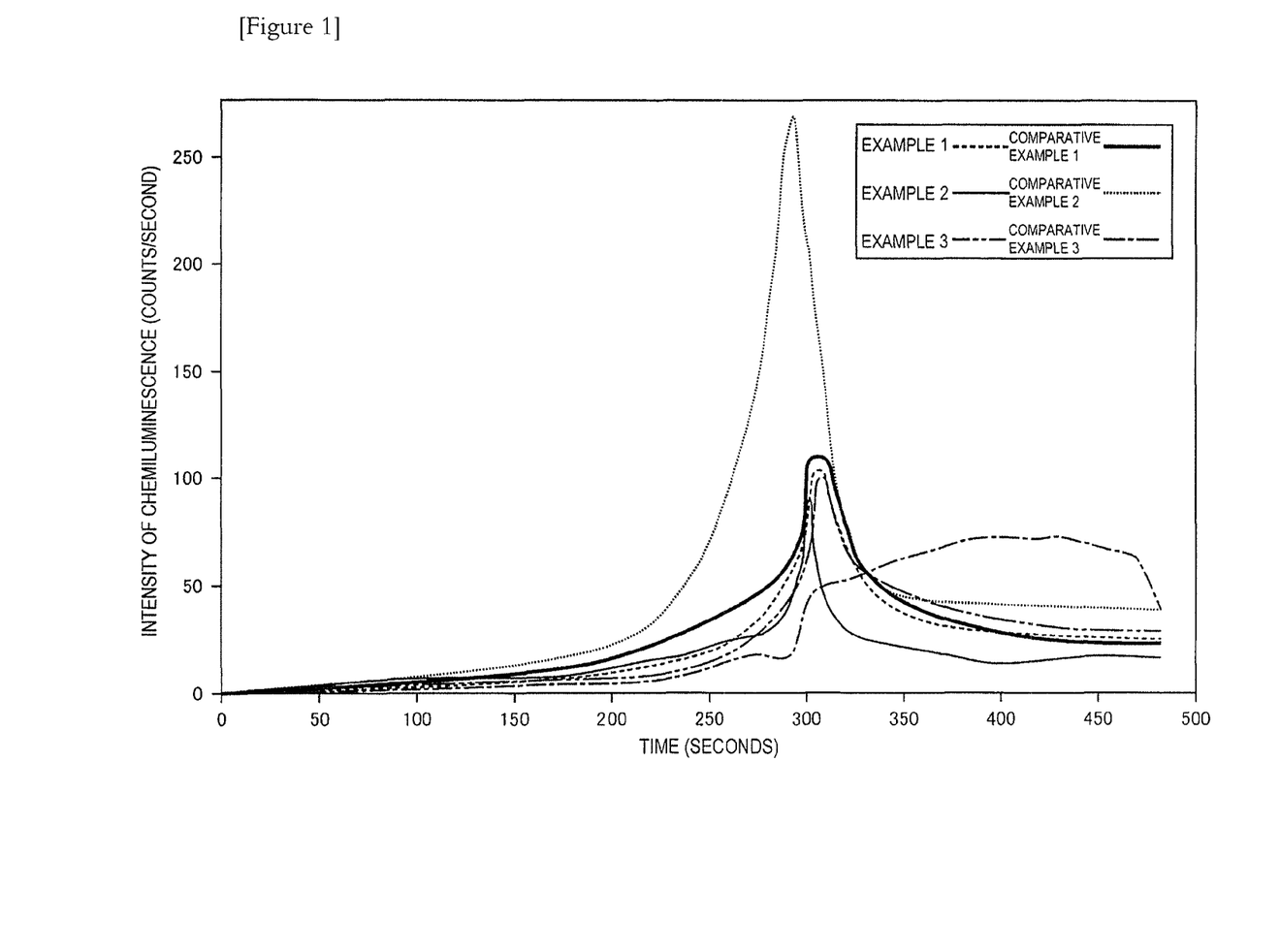
FIG. 1 is a graph showing measurement results of the amount of chemiluminescence.

Other measurement conditions were as follows.
Measured wavelength range: 405 nm to 650 nm
Atmosphere inside sample chamber: Nitrogen
Nitrogen gas flow rate inside sample chamber: 150 mL/minute
Detection scheme: Single photon counting FIG. 1 shows the measurement results of the amount of chemiluminescence for the molded products of Examples 1 to 3 and Comparative Examples 1 to 3.

(Measurement 2)

Subsequently, in order to remove the luminescence derived from the aluminum pan from the results of measurement 1 described above (baseline correction), only the aluminum pan was put into the sample chamber maintained at 100° C., and the same operation as above was performed. The integrated amount of luminescence was calculated from the obtained measurement results.

The integrated amount of luminescence of each of the molded products of Examples and Comparative Examples was obtained by subtracting the integrated amount of luminescence obtained in (measurement 2) from the integrated amount of luminescence obtained above (measurement 1).

Further, in order to correct the variation in the amount of luminescence due to the amount of the molded product put into the sample chamber, the integrated amount of luminescence for each of the molded products of Examples and Comparative Examples was divided by the weight of the molded product, and the integrated amount of luminescence per mg of the molded product was calculated.

(3) Hue Evaluation

For each of the molded products produced in Examples 1 to 3 and Comparative Examples 1 to 3, the yellowness (YI value) was measured using a colorimeter ASA1, manufactured by NIPPON DENSHOKU INDUSTRIES CO., LTD. (ASTM D 1925).

The measurement results of the integrated amount of luminescence per mg of the molded product and the YI value are summarized in Table 1 below. Further, the relationship between the integrated amount of luminescence and the YI value is shown in FIG. 2.

TABLE 1

|  | Example 1 | Example 2 | Example 3 | Comparative Example 1 | Comparative Example 2 | Comparative Example 3 |
|---|---|---|---|---|---|---|
| YI value | 21.9 | 20.3 | 16.3 | 29.2 | 43.2 | 28 |
| Integrated amount of luminescence (counts)/1 mg | 10177 | 7299 | 10090 | 12474 | 21145 | 12580 |

Figure 2:
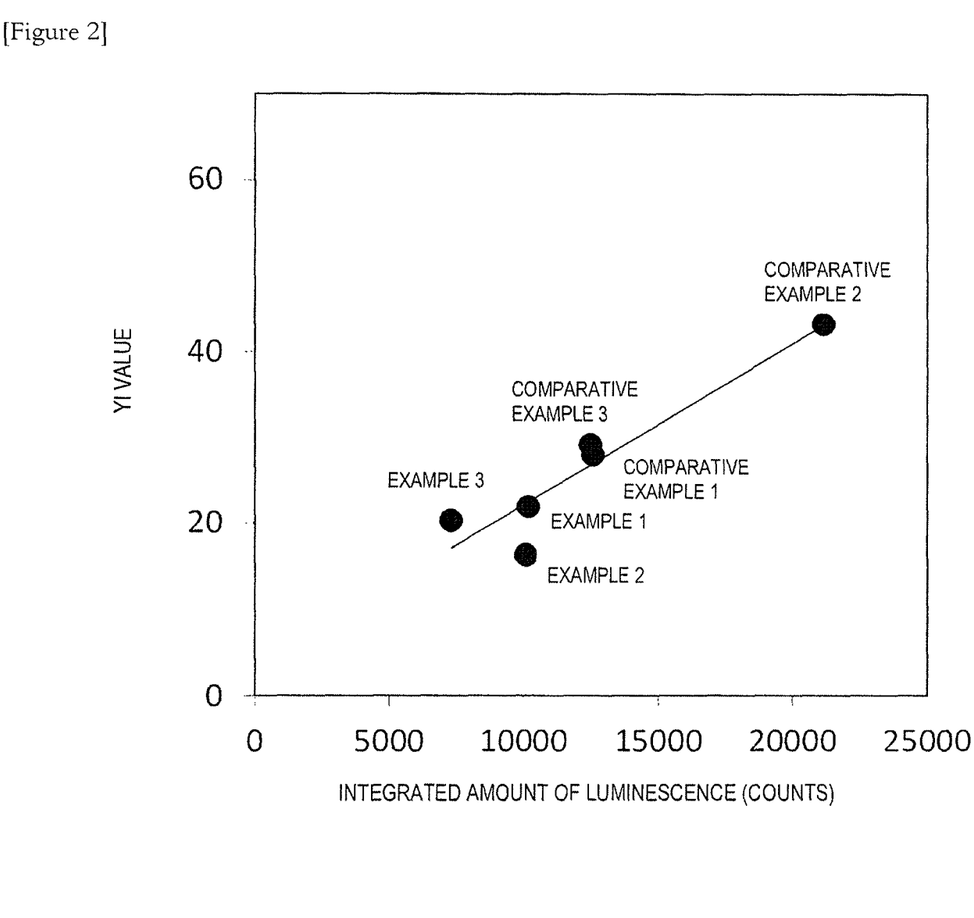
FIG. 2 is a graph showing the relationship between the integrated amount of luminescence and YI value.

Further, the relationship between the integrated amount of luminescence per mg of the molded product and the YI value is shown in FIG. 2. It can be said from FIG. 2 that an obvious correlation can be seen between the integrated amount of luminescence and the YI value, and as the integrated amount of luminescence increases (that is, the amount of organic peroxide in the molded product increases), the molded product becomes more yellowish. Accordingly, in use for applications that require transparency such as eyeglass lenses and front surface plates for displays, the integrated amount of luminescence (that is, the amount of organic peroxide) needs to be controlled to a certain range.

(3) Optical Transparency

For each of the molded products produced in Examples 1 to 3 and Comparative Examples 1 to 3, the optical transmittance (transmittance spectrum) was measured. The measurement of the optical transmittance at 400 nm or more was performed using ASA-1, manufactured by NIPPON DENSHOKU INDUSTRIES CO., LTD., and the optical path length in the spectrum measurement was set to 300 mm. The measurement of the optical transmittance at 400 nm or less was performed using UV-2450 UV-VIS SPECTROPHOTOMETER, manufactured by SHIMADZU CORPORATION, and the optical path length in the spectrum measurement was set to 4 mm.

Figure 3:
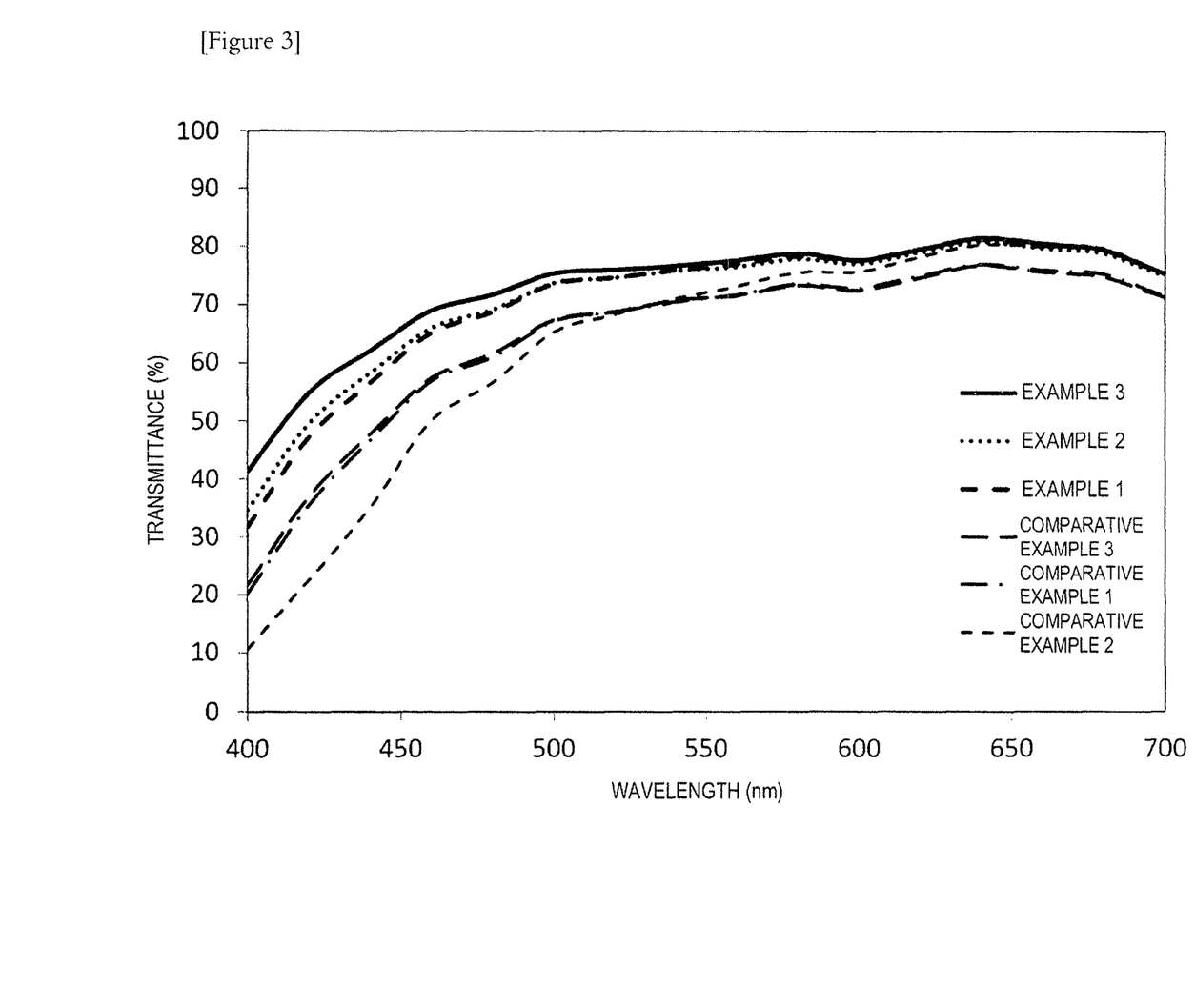
FIG. 3 is a graph showing measurement results of optical transmittance at 400 nm or more.
Figure 4:
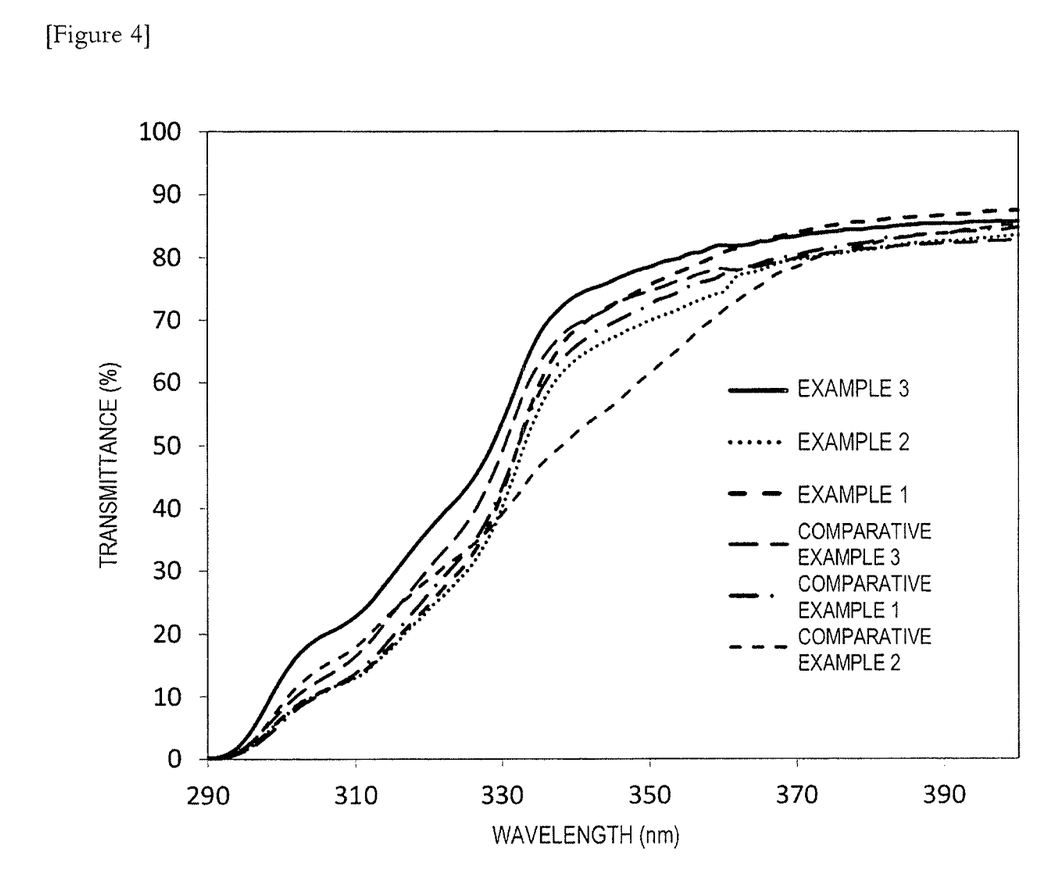
FIG. 4 is a graph showing measurement results of optical transmittance at 400 nm or less.

The measurement results of the optical transmittance at 400 nm or more are shown in FIG. 3, and the measurement results of the optical transmittance at 400 nm or less are shown in FIG. 4. It can be seen from FIG. 3 and FIG. 4 that, in the molded products of Examples, transmission of light in the ultraviolet region and light in the short wavelength region of visible light that have adverse effects on human body can be particularly suppressed.

As can be seen from the above, a polycarbonate resin molded product having both transparency and light blocking properties can be obtained by controlling the amount of peroxide in the polycarbonate resin molded product to a specific range. Since the molded product according to the embodiment of the present invention, while being capable of blocking light over a wide range of wavelength, can particularly effectively block light in the ultraviolet region and light in the short wavelength region of visible light that can have adverse effects on human body, use thereof in various applications is expected. Further, there is no need of using further materials or members for blocking light, and therefore a molded product having excellent light blocking properties can be produced conveniently and inexpensively.

It should be understood that some embodiments of the invention described herein are intended for purposes of illustration only and are not intended to limit the scope of the invention. These novel embodiments can be embodied in various other forms, and various omissions, substitutions, and changes can be made without departing from the scope of the invention. These embodiments and their modifications as would fall within the scope and spirit of the invention and are included in the invention described in the appended claims and their equivalents.

The invention claimed is:

1. A polycarbonate resin molded product, comprising a polycarbonate resin composition wherein
the integrated value of the amount of chemiluminescence derived from organic peroxide is 4,000 to 12,000 counts per mg of the molded product, and
the integrated value of the amount of chemiluminescence is a value obtained by integrating the amount of chemiluminescence at a wavelength of 405 to 650 nm that is measured during 480 seconds in which under a nitrogen atmosphere the temperature is raised from 100° C. to 350° C. at a rate of 50° C./minute and thereafter is maintained at 350° C. for 180 seconds,
transmittance of light in the ultraviolet region and light in the short wavelength region of visible light is 70% or less, and yellowness (YI value) is 29 or less,
molding is performed by extrusion with an extrusion screw, and
a ratio (Q/Ns value) of discharge rate (Q in kg/hr) during extrusion with respect to rotational speed (Ns in rpm) of the extruder screw is 0.2 to 0.7 when the screw has a diameter of 50 mm or less, and 1 to 2 when the screw has a diameter exceeding 50 mm.

2. A method for producing the polycarbonate resin molded product according to claim 1, comprising:
   (a) mixing the polycarbonate resin with an additive including an antioxidant to obtain a mixture;
   (b) molding the mixture in the presence of an inert gas to obtain pellets; and
   (c) molding the pellets to obtain the polycarbonate resin molded product.

3. An eyeglass lens comprising the polycarbonate resin molded product according to claim 1.

4. A front surface plate for a display, comprising the polycarbonate resin molded product according to claim 1.

5. A substrate for fluorescence detection analysis, comprising the polycarbonate resin molded product according to claim 1.

6. A light guide plate comprising the polycarbonate resin molded product according to claim 1.

* * * * *